United States Patent [19]

Bowman, deceased

[11] E Re. 29,528

[45] Reissued Jan. 31, 1978

[54] JET FIRED ZONAL LEHR FOR APPLYING TREATING MEDIUM INSIDE AND OUTSIDE OF GLASS CONTAINERS SIMULTANEOUSLY

[75] Inventor: Edward W. Bowman, deceased, late of Uniontown, Pa., by Muriel B. Bowman, co-executor

[73] Assignee: E. W. Bowman, Incorporated, Uniontown, Pa.

[21] Appl. No.: 704,090

[22] Filed: July 9, 1976

Related U.S. Patent Documents

Reissue of:

[64] Patent No.: 3,754,885
Issued: Aug. 28, 1973
Appl. No.: 197,302
Filed: Nov. 10, 1971

[51] Int. Cl.[2] ..... C03B 25/04

[52] U.S. Cl. ..... 65/119; 65/350; 65/351; 432/48

[58] Field of Search ..... 65/118, 119, 348, 350, 65/351; 118/324; 198/22 B, 85, 103; 432/48

[56] References Cited

U.S. PATENT DOCUMENTS

| | | | |
|---|---|---|---|
| 1,745,362 | 2/1930 | Evans | 65/348 X |
| 2,244,772 | 6/1941 | Geer | 65/349 |
| 2,982,052 | 5/1961 | Lawson | 65/350 X |
| 3,303,918 | 2/1967 | Larson | 198/103 |
| 3,387,962 | 6/1968 | Whitmire | 65/350 X |
| 3,463,465 | 8/1969 | Fuller | 432/48 X |

*Primary Examiner*—Arthur D. Kellogg
*Attorney, Agent, or Firm*—Donald D. Jeffery

[57] ABSTRACT

This disclosure relates to a method and apparatus for annealing glassware by passing the ware continuously through a tunnel in which the application of heat and recirculation of the gaseous treating medium is regulated to establish and maintain independently controllable heating and cooling zones. An endless perforated conveyor passes from end to end of the tunnel and the ware is placed on the conveyor in alignment with and beneath a jet-like blast of the treating medium internally and externally of the ware simultaneously to subject all of the ware to uniform treatment in minimum time. The treating medium in the heating zones of the tunnel is recirculated and furnace pressure and temperature is regulated by circulating fans and by dampers between the furnace chambers with the outside atmosphere.

8 Claims, 8 Drawing Figures

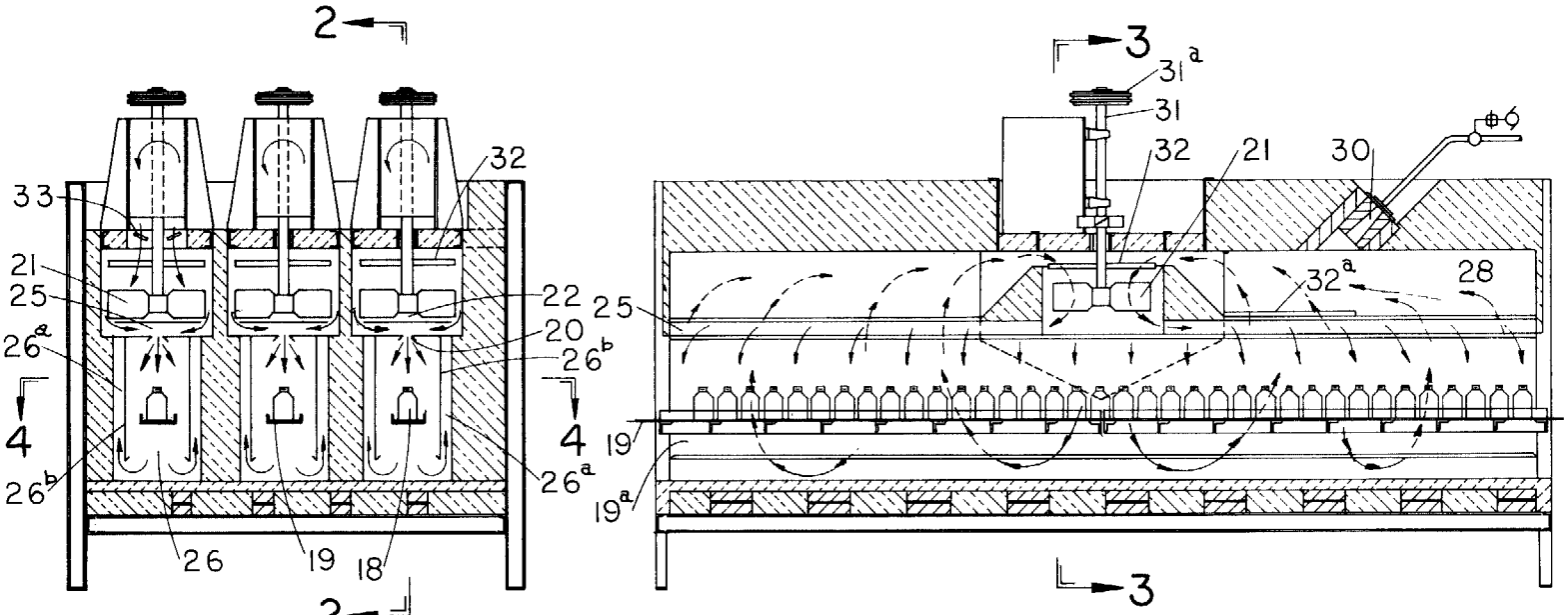
Fig. 2
Fig. 3
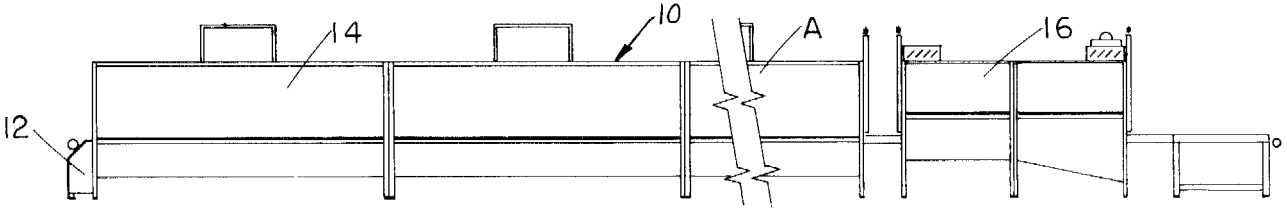
Fig. 1
INVENTOR
EDWARD W. BOWMAN
BY William B. Jaspert
ATTORNEY INVENTOR
EDWARD W. BOWMAN
BY William B Jaspert
ATTORNEY INVENTOR
EDWARD W. BOWMAN
BY William D. Jaspert
ATTORNEY INVENTOR
EDWARD W. BOWMAN
BY William B. Jaspert
ATTORNEY

JET FIRED ZONAL LEHR FOR APPLYING TREATING MEDIUM INSIDE AND OUTSIDE OF GLASS CONTAINERS SIMULTANEOUSLY

Matter enclosed in heavy brackets [ ] appears in the original patent but forms no part of this reissue specification; matter printed in italics indicates the additions made by reissue.

In general the construction of the tunnel utilizes the usual metal housing and supporting buck stays with refractory linings in the walls of the treating chambers and heat insulation adjacent the outside metal walls to reduce heat radiation losses. The tunnel chamber has spaced inner walls open at the bottom for recirculating the treating medium by fan suction around the outside of the inner wall upward to a firing chamber into which burners are directed. Beneath the firing chamber is a recirculating chamber which has a slotted bottom and may be designated a trough. A circulating fan forces the treating medium under pressure through the slot in the bottom of the recirculating chamber to the ware supported on the conveyor underneath. Dampers control the pressure in the heating chamber and regulate temperature by admission of cold outside air to the firing chamber.

To further assure uniform treatment of each piece of ware passing through the annealing tunnel a single line conveyor may be employed as will be hereinafter described.

BACKGROUND OF THE INVENTION

1. Field of the Invention

This invention relates to a method and apparatus for annealing glassware and the like by directing the annealing medium to the inside and outside of the ware simultaneously for rapid and uniform treatment of each product being treated while maintaining independent temperature control in a series of communicating zones through which the ware travels.

2. Description of the Prior Art

Automated zonal lehrs for high quality annealing described and claimed in my Pats. Nos. 3,010,710, 3,261,596 and 3,371,430 are in general use throughout the United States and Canada and are recognized as a system of annealing that provides better temperature control from the charge to the discharge end of the lehr tunnel. Prior to the introduction of the zonal control system, the heat curve for preheating and annealing was maintained by the application of heat and cooling media transversely of the tunnel in increments longitudinally of the tunnel. This method required relatively long lehr tunnels that took up a lot of needed space because of the necessary slow travel of the lehr conveyor belt. This allowed limited production for the required annealing time.

These prior art annealing systems utilized special equipment for charging the glassware to the lehr conveyor belts which employed star-wheel transfer mechanism and transverse conveyors, push bar stackers, spray-on packing tables, unscramblers and the like, which are eliminated in the single line conveyor type lehrs of this invention where the ware is transferred directly from the forming machine to the lehr conveyor belt. The single line conveyor may be directed through a wider and much shorter lehr with a plurality of parallel adjacent tunnels and a continuous conveyor passing therethrough.

The jet firing to the inside and outside of the ware allows for rapid annealing superior to treating from outside the ware only. By combining the jet firing treatment with the zonal controls of my former patents referred to above, the annealing time is substantially reduced. By this method a gallon container has been annealed in one-fourth the time with a conveyor belt travel of from 40 to 60 feet per minute. The annealing of glassware and the like by the present method will greatly reduce the cost of producing glassware.

SUMMARY OF THE INVENTION

The herein disclosed method and apparatus for annealing reduces substantially the time required to anneal glassware, the conveyor or belt speed being more than double that of the old type lehr. My invention reduces the amount and size of equipment necessary and utilizes burners, fans and dampers as simple controls for regulating the treating medium in adjacent zones through which the ware is conveyed.

Accordingly, the principle object of this invention is to provide an improved method of annealing glassware and the like by directing the preheating and heating medium to the inside and outside of the glassware simultaneously.

Another object of this invention is to pass the ware thus being annealed through separately controllable temperature zones.

Still a further object of this invention is to provide single line conveying means on which the ware rests in proper alignment beneath the jet of treating gases to receive the treating medium inside and outside the ware simultaneously.

These and other objects of this invention will be more completely disclosed and described in the following specification, the accompanying drawings and claims.

BRIEF DESCRIPTION OF THE DRAWINGS

FIG. 1 is a side elevational view diagrammatically illustrating a continuous tunnel lehr made up of sections, each of which constitutes a separate temperature control zone;

FIG. 2 is a vertical section diagrammatically illustrating one of the preheat and/or heating zones taken along the line 2—2, FIG. 3 longitudinally of the tunnel lehr;

FIG. 3 is a vertical section taken along the line 3—3 of FIG. 2;

DESCRIPTION OF PREFERRED EMBODIMENT

Figure 4:
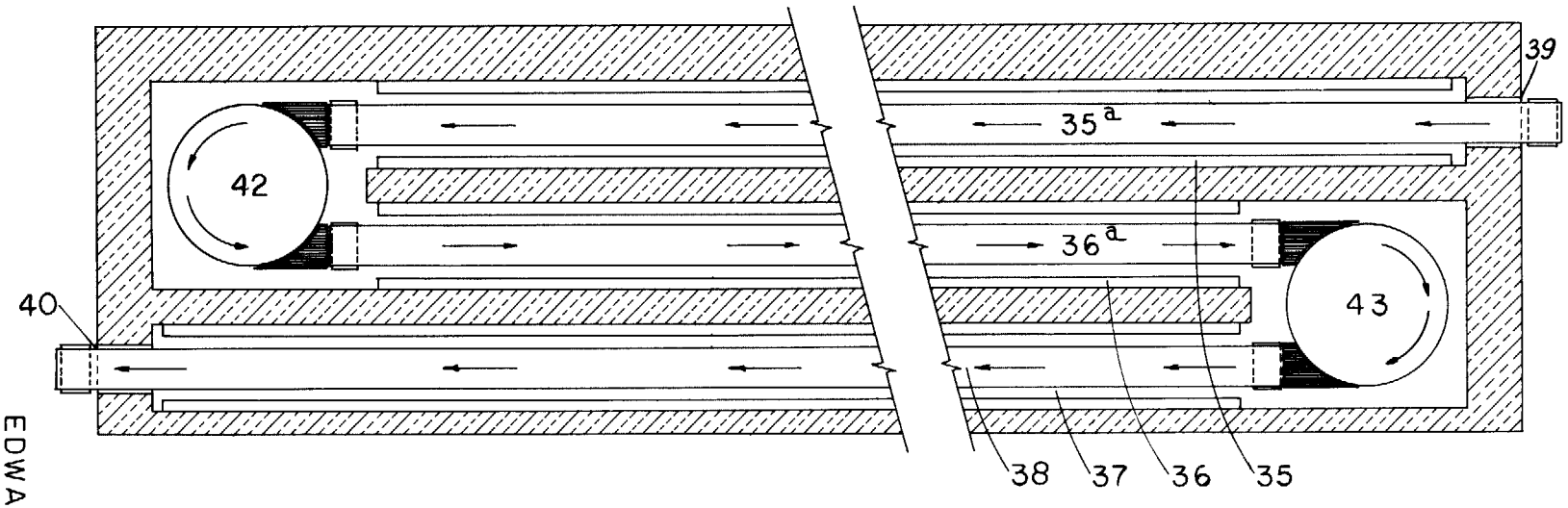
FIG. 4 is a longitudinal section of a single line conveyro unit taken along the line 4–4 of FIG. 3.

Referring to FIG. 1 of the drawings, there is illustrated a tunnel lehr generally designated by the numeral 10 made up of zonal sections "A" of which there may be more or less such as two to eight or more in tandem. At the front of the lehr there may be a belt preheating chamber 12 and a ware preheater radiant firebox 14. At the rear or discharge end of the lehr there is a cooling section 16, disclosed in Pat. No. 3,371,430 aforementioned which parts of the lehr form no part of the present invention, but represent the most favorable environment in which the present invention is useful and effective.

The internal, external jet firing as applied to a single line lehr is shown in FIGS. 2 and 3 inclusive. FIG. 3 shows three rows of what may be termed wide-mouth ware such as jars or tumblers 18. The ware is placed on the endless open mesh conveyor 19 in alignment with the slotted openings 20 of a recirculating chamber 25 from which a blast of treating gases is forced by a fan 21, FIGS. 2 and 3, as shown by arrows.

Fan 21 is mounted in a well 22 that communicates with the trough or recirculating chamber 25 in the bottom of which the slots 20 open to the treating or tunnel chamber 26. A return flow passage 26a is provided on each side of the chamber 26 by partition walls 26b which draw the treating gases that pass from chamber 26 through the open mesh conveyor 19 into a firing chamber 28 above the trough 25. Burners 30 are provided in the firing chamber 28 as shown in FIG. 2. The space below conveyor 19 may be designated by numeral 19a. Fan 21 is driven by a motor (not shown) mounted on the roof of the lehr through which the drive shaft 31 extends with its belt pulley 31a. Damper 32 regulates the volume flow of the treating meadium from the firing chamber 28 to the trough 25 as controlled by the speed of fan 21 and dampers 33 regulates the flow of cold air to the circulating treating medium in firing chamber 28. The numeral 32a is a refractory burner baffle.

Figure 5:
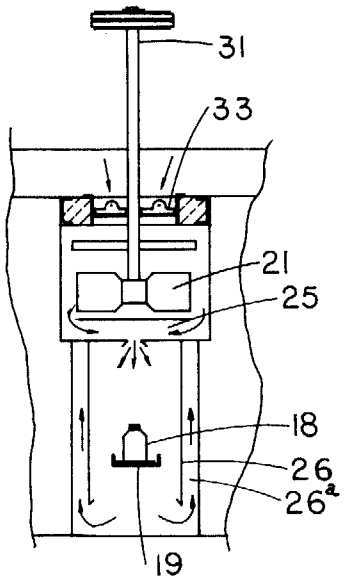
FIG. 5 is a vertical section diagrammatically illustrating the flow of the gaseous treating medium in a single line conveyor passing through relatively short parallel tunnel sections that communicate at their ends as shown in FIG. 4.
Figure 8:
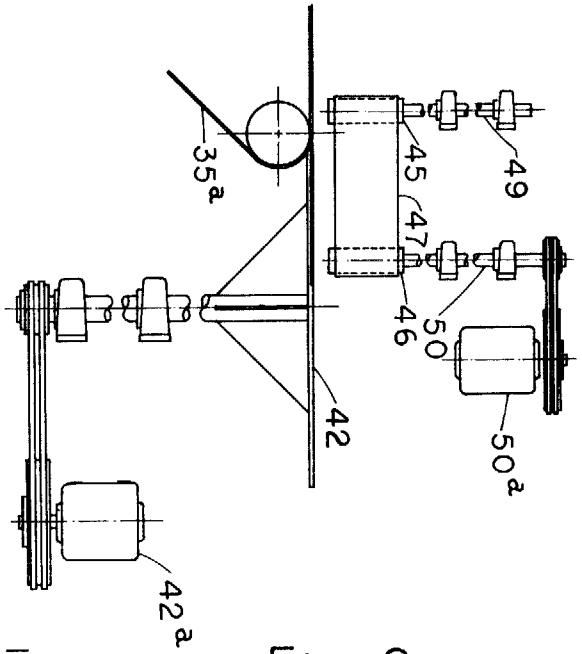
FIG. 8 is a side elevation taken along the line 8—8 of FIG. 7.

The single line lehr of FIGS. 4 and 5 consists of a plurality of relatively short annealing tunnels 35, 36 and 37, but more or less may be used. Each tunnel has an endless conveyor belt 38, preferably of the open mesh type, for conveying the ware from the charging end 39, through the tunnels 35, 36 and 37 to the discharge end 40. The belt 38 moves the ware from tunnel 35 to a transfer table 42 from which it is discharged to conveyor 36a in tunnel 36 and then again transferred to a transfer table 43 and from the latter to the conveyor 38 by means of a series of rollers as follows:

FIG. 8 diagrammatically illustrates in dot and dash lines a pair of guide rolls 45 and 46 connected by belts 47 under which conveyors 35a and 36a are shown traveling. The top of guide roll 45 is in a plane with the top of transfer table 42 and roller 46 is spaced below table 42. Any ware on conveyor 35a is pushed onto the surface of table 42 and goes around with the table and moves on to belt 36a moving in the reverse direction through tunnel 36 as shown by arrows.

Figure 7:
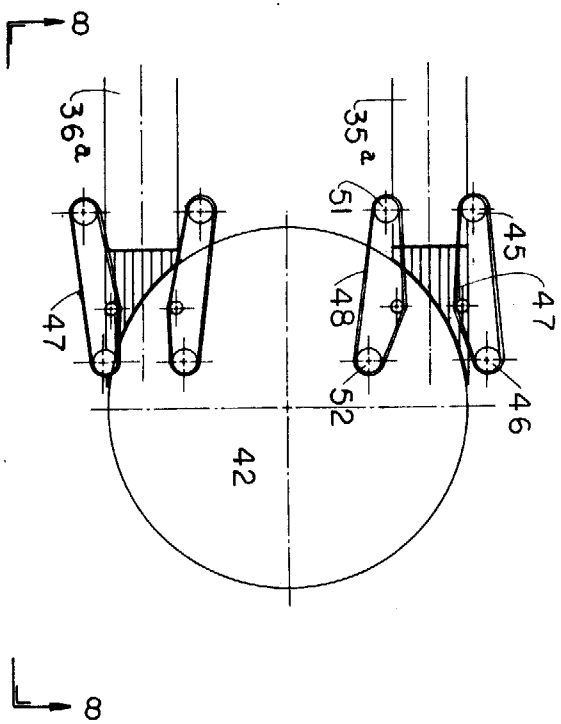
FIG. 7 is a top plan view diagrammatically illustrating a turntable and guide rolls for the single line conveyor.

Guide belts 47 are driven by shafts 49 and 50 driven by motor 50a and guide belts 48 by motor driven shafts 51 and 52, FIGS. 7 and 8. The guide belts realign the ware on the conveyors to be below the jet openings 20 of the recirculating chamber 25 and are driven at the same speed as the conveyor belts 35a and 36a. Transfer table 42 is driven by motor 42a.

As shown in FIG. 4, there is an endless conveyor in each of the tunnels 35, 36 and 37 passing over drive pulley 55, 56 and 57 and idler guide pulleys 58, 59 and 60. The specific drive and tension mechanism is not shown or claimed.

Figure 6:
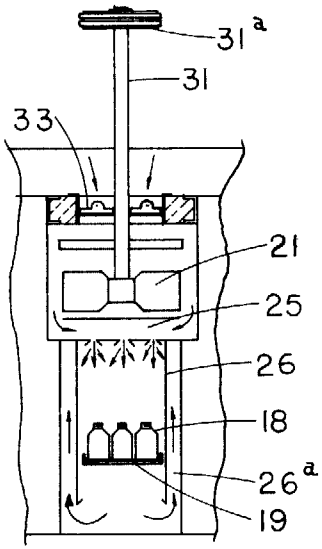
FIG. 6 is a vertical section of a tunnel lehr having multiple rows of ware underneath spaced jet outlets to illustrate the jet firing inside the ware as applied to wide belt conveyors supporting rows of glassware.

The jet firing and zonal control means and method shown in FIG. 5 for the single line lehr is the same as shown in FIG. 6 for the wide conveyor which shows multiple rows of ware on a wide conveyor in alignment with multiple jet blasts from the slots 20 of the trough 25.

In FIG. 5 heated or cooled treating medium from chamber 28 is drawn by fans 21 into troughs 25 and forced through slots 20 into and around the ware on conveyor 19 in the treating chamber. It is drawn downward through the perforated conveyor around the ware and then drawn up around partition walls 26a back into firing chamber 28.

Although the jet firing into and around the ware has been described in conjunction with zonal lehr controls and single line and multiple line conveyors, it is evident that the jet principle of firing or treating ware may be practiced with any kind of lehr structure capable of moving ware continuously through an annealing chamber. It is also apparent that the jet firing method reduces the total annealing time especially when employed in zonal lehrs and therefore increases the annealing capacity of a lehr of given size. Consequently, lehrs can be reduced in size especially with the multiple tunnel single line lehrs which provide uniform treatment for each product passing through the lehr.

According to the provisions of the patent statues, the principle, and mode of operation of this invention have been explained, illustrated and described, but it is evident to those skilled in the art that modifications may be made in the steps of the method and details of construction without departing from the principles herein set forth.

I claim:

1. A glass annealing lehr for treating hollow glassware such as bottles and the like, which consists of a tunnel having undivided separately controllable temperature zones, longitudinally of said tunnel and having superposed treating, recirculating and firing chambers vertically of said tunnel, a conveyor for supporting and passing the products to be annealed through said treating [chambers] *chamber,* and a fan mounted for delivering the convective treating medium to the recirculating chamber under pressure, said recirculating chamber [having an opening] *being formed with a longitudinally extending slot* aligned over the ware supported on said conveyor for jetting the treating medium into the mouth and simultaneously around the outside wall of the ware supported on said conveyor[.], *and return flow passages at the sides of said treating chamber for drawing the treating gases therefrom for return to said fan.*

2. A glass anneaing lehr set forth in claim 1 in which the conveyor is of a construction to allow the treating medium to pass therethrough and the jet opening is a slot in alignment with [rows] *a row* of ware passing therebeneath and extending the length of the treatment chamber.

3. A glass annealing lehr set forth in claim 1 in which the volume of air drawn into the firing chamber and the volume of treating medium delivered to the treatment chamber are separately controlled.

4. A glass annealing lehr for treating hollow glassware such as bottles and the like which consists of a tunnel having a treating chamber, a pressure duct and a heating chamber in superposed relation, a conveyor for supporting and passing the products to be annealed in rows through said treating chamber from the charging to the discharge end thereof and recirculating ducts at the sides of said treating chamber open at the bottom below said conveyor and communicating at the top with said heating chamber, said heating chamber having regulable heating means for producing a convective heating medium of a suitable temperature, said pressure duct having an opening aligned over said products passing on said conveyor, and a fan for mixing said heating medium with the recirculated treating medium drawn through the side ducts and jetting it under pressure through said opening in said pressure duct downward into and around the product on the conveyor passing through the treating chamber.

5. In the method of annealing *open top* glassware such as bottles and the like [in a tunnel shaped treating chamber having a support for the ware between the top and bottom of the tunnel,] *in a glass annealing lehr having in superposed relation, a treating chamber, a recirculating chamber and a firing chamber, and return flow passages at opposite sides of said treating chamber, comprising* the steps of withdrawing a heat treating fluid from beneath the ware, recirculating said fluid [to a zone over said ware] *through said return flow passages first to said firing chamber and then to said recirculating chamber,* and *continuously* directing said fluid downwardly *through a longitudinally extending slot in said recirculating chamber* into the mouth of the ware and around the sides of the ware simultaneously *as the ware is moved longitudinally through said treating chamber.*

6. The method of annealing glassware set forth in claim 5 in which the heat treating fluid is under pressure when it passes into the mouth and around the sides of the ware.

7. The method of annealing glassware set forth in claim 5 in which the heat treating fluid is recirculated after passing around the sides of the ware.

8. The method of annealing glassware set forth in claim 5 in which the bottles are supported in [rows] *a row* and the heat treating fluid is directed in alignment with and into and around the ware in said [rows] *a row.*

* * * * *